United States Patent [19]

Bynum

[11] Patent Number: 4,901,955

[45] Date of Patent: Feb. 20, 1990

[54] FAUCET OR YARD SPRINKLER SUPPORT

[76] Inventor: Mac W. Bynum, Rte. 3, Box 423, Taylorsville, Miss. 39168

[21] Appl. No.: 311,804

[22] Filed: Feb. 17, 1989

[51] Int. Cl.⁴ .................... F16L 3/00

[52] U.S. Cl. .................... 248/49; 239/276

[58] Field of Search .................... 248/49, 188.9, 156, 248/508; 239/276, 204; 52/292

[56] References Cited

U.S. PATENT DOCUMENTS

| | | | |
|---|---|---|---|
| 2,631,061 | 3/1953 | Nelson | 239/276 X |
| 3,542,294 | 11/1970 | Tucker | 239/276 X |
| 3,844,516 | 10/1974 | Klarke | 239/276 X |
| 4,001,990 | 1/1977 | Chase et al. | 52/292 X |
| 4,275,839 | 6/1981 | Olson | 239/276 X |

*Primary Examiner*—Ramon O. Ramirez
*Attorney, Agent, or Firm*—Edwin E. Greigg

[57] ABSTRACT

A protective support for a faucet connected to an underground pipe as well as for protection of a yard sprinkler. At least two arms are secured to a central holder for supporting a faucet or a sprinkler. The arms are provided with angularly disposed legs to which are secured feet at their bottom end. The support is placed underground with the arms substantially parallel with the ground surface so that the legs extend downwardly. The arms, legs and feet project the faucet or sprinkler head against being pulled sidewise to prevent breakage or harm thereto.

3 Claims, 1 Drawing Sheet

FAUCET OR YARD SPRINKLER SUPPORT

BACKGROUND OF THE INVENTION

This invention is directed to a protective support for a faucet or yard sprinkler which will prevent undue damage to a sprinkler or faucet during use.

It is well known that considerable damage may be rendered to an underground pipe or a riser pipe connected to a faucet or sprinkler head in a yard. Damage to the faucet and or pipe connection may be caused by overextending a hose connected to the faucet where the hose is pulled at such a force that the riser pipe breaks at the feed pipe. Further, it is known that sprinklers may be caught by a lawn mower, or vandals may attempt to pull the sprinkler from the ground causing damage to the pipe connection.

SUMMARY OF THE INVENTION

This invention is directed to a support which is secured to a pipe coupling to which a nipple and faucet may be connected as well as to a support which is secured to a sprinkler head holder. The support is placed in the ground below the ground level to provide a side wise support against pulling in a direction related to the direction of the underground supply pipe.

It is therefore an object of this invention to provide a support which may be secured to an underground pipe or sprinkler fitting which will prevent damage to the underground pipe or connection.

Another object is to provide a support which includes a fitting to which a faucet may be easily connected or a fitting to which a sprinkler head may be easily secured.

The invention will be better understood and further objects and advantages thereof will become more apparent from the ensuing detailed description of preferred embodiments taken in conjunction with the drawings.

DETAILED DESCRIPTION

Figure 1:
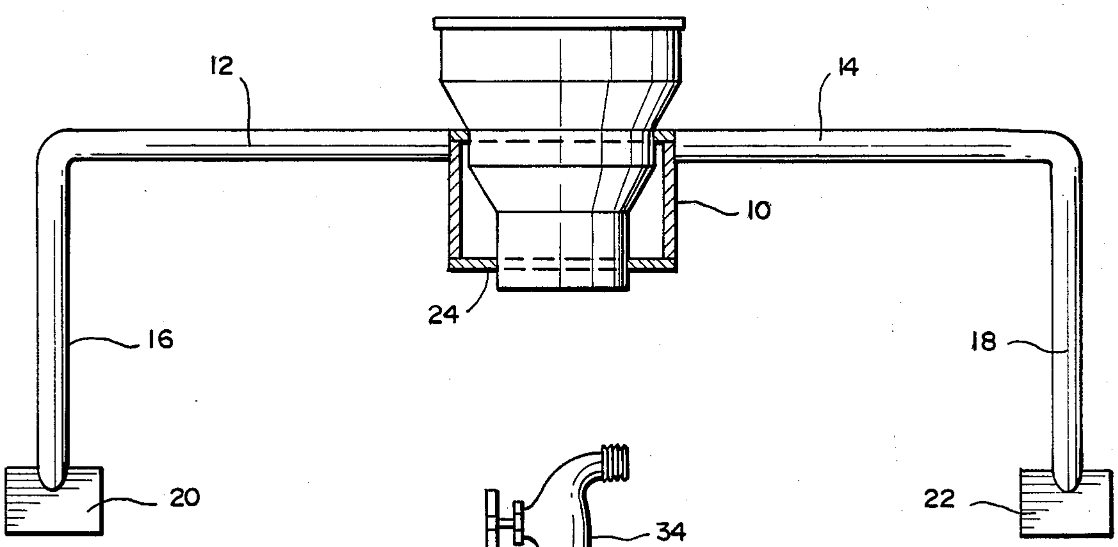
FIG. 1 is a view illustrating a ground support secured to a sprinkler holder.
Figure 3:
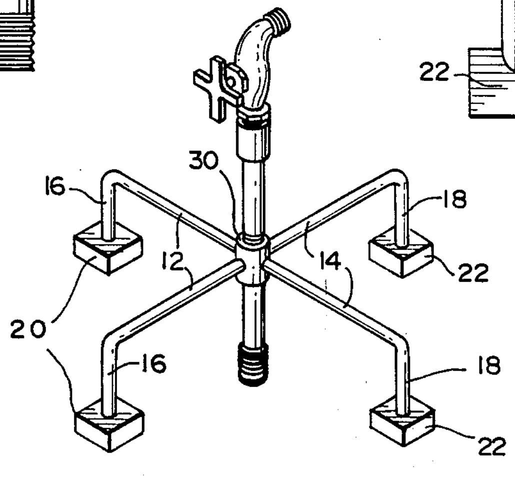
FIG. 3 illustrates a modification of the holder shown in FIGS. 1 and 2.

Now referring to the drawings, there is shown in FIG. 1, an underground support for a sprinkler including a sprinkler body 10, such as a NELSON sprinkler, to which oppositely disposed horizontal arms 12 and 14 have been secured substantially perpendicular to an axis of the sprinkler body by brazing, welding or any suitable means. Each of the arms 12 and 14 have a vertically disposed leg 16 and 18 at a substantially 90° angle relative to the horizontal arms. The legs are provided on their ends with an enlarged foot 20, 22 which aids in supporting the support in the ground. The water supply, not shown, connects with the bottom 24 of the sprinkler body and when the water is admitted to the sprinkler the sprinkler head pops up and the water is sprayed from the sprinkler. In yards, in which the feed pipe is directed in a grid underground, the sprinkler support of this invention may be fixed so that the arms are perpendicular with the feed pipe connected to the sprinkler. In this way, the feed pipe will function as a support relative to the disclosed support. Further, four arms may be used instead of two arms such as shown in FIG. 3, where the arms are substantially perpendicular to each other. In this modification the feed pipe would be fed between the arms. Thus, the fourarmed support and the feed pipe would provide a good support against movement of the sprinkler head from a vertical position.

Figure 2:
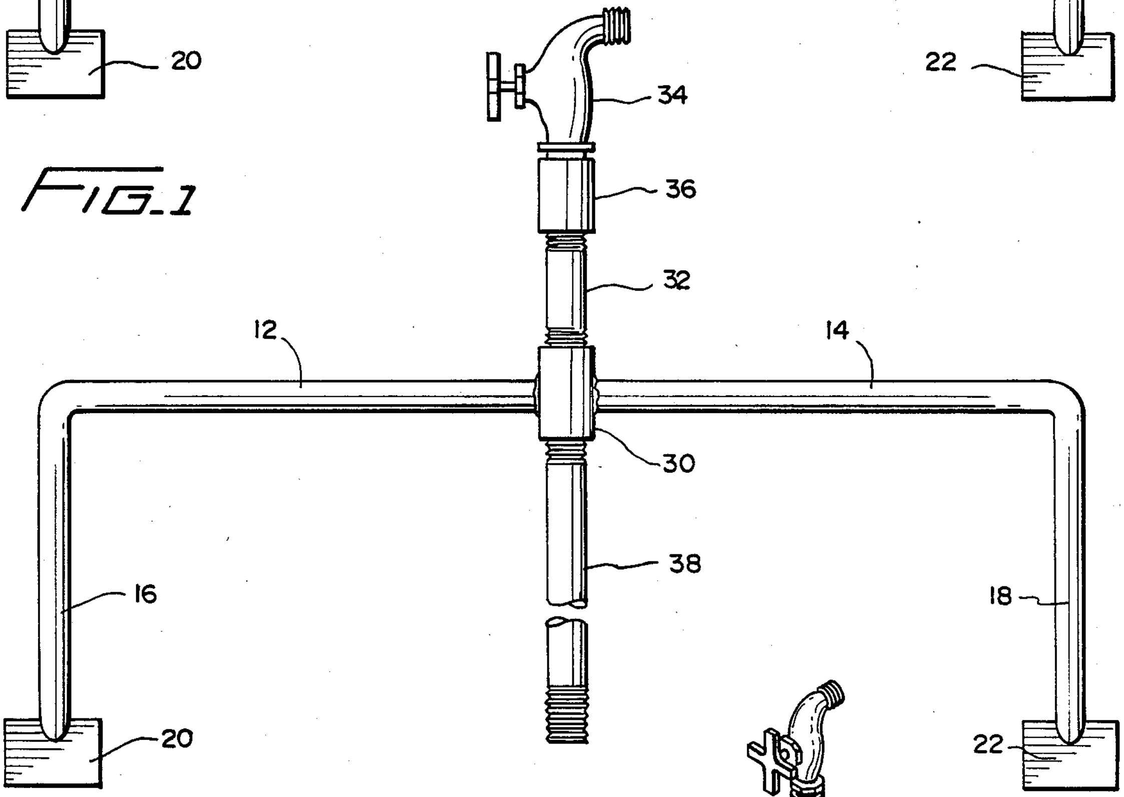
FIG. 2 a view illustrating a ground support secured to a pipe coupling to which a faucet and a ground supporter is connected, as shown.

The support as shown in FIG. 2 includes a pipe coupling 30 to which arms 12 and 14 with legs 16, 18 and feet 20, 22 such as shown in FIG. 1 are secured. As shown in FIG. 2 a nipple 32 is secured to the support coupling and a faucet 34 is secured to the nipple by use of a coupling 36. A water supply is connected by a nipple 38. The faucet may be rotated to any desired position relative to the arms or the arms may be placed in the ground so that the faucet outlet will be directed in a desired direction. For the greatest support with two arms as shown in FIG. 3 the outlet of the faucet should be aligned with the support arms such that the faucet will be pulled in a direction along one arm.

As shown in FIG. 3 the faucet could be provided with a support having four arms which are substantially perpendicular to each other. Thus, the faucet will have greater support when directed in any direction.

It is well known that the supply pipe should be below ground sufficiently that it will not disturb the growth of the grass. Further, the support set forth herein should be sufficiently below the ground level that it will support a sprinkler body below ground. The arms of the support will be substantially parallel with the ground surface with the legs perpendicular to the ground surface. The feet are much larger than the legs so the feet will support the legs against pulling out of the ground. Also, the feet could be secured in cement so that the pull will be on the cement which will provide a much greater area to be pulled from the ground.

Since the arms are connected to the sprinkler body or pipe coupling, the sprinkler or faucet will be supported against pulling from the ground and will be rigidly supported against side-wise pulling. Thus, the sprinkler or faucet will have considerable support.

The arms and legs are shown as rods, the same could be made from pipe, tubing or solid pieces. Solid pieces would provide the greatest support.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A faucet or yard sprinkler underground holder support which comprises:
   - a central support means for connecting a water supply thereto and from which water is expended;
   - two pair of outwardly extending support arms secured at one end thereof to said central support means for supporting said central support means in place;
   - a leg secured to each outwardly extending arm at an angle relative thereto, with each of said legs extending in the same direction and substantially parallel with each other;
   - a foot secured to each of said legs on a bottom end thereof;

whereby said arms and said two pairs of legs extend in a direction such that they may be placed underground with said arms substantially parallel with the ground surface with said central support means supported below ground level in a vertical position with said legs and said foot secured thereto below said two pair of legs.

2. A holder support as set forth in claim 1, in which, said central support means is a housing for an underground sprinkler head to which underground piping for water may be connected and directed between said legs.

3. A holder support as set forth in claim 1, in which, said central support is a tee-connection having a central portion to which piping to a faucet is secured and to which underground piping can be connected and directed between said legs.

* * * * *